Nov. 14, 1950     L. A. V. ROZAS     2,529,966
PROPELLING ROD FOR PARACHUTIST

Filed Aug. 15, 1946     3 Sheets-Sheet 1

*INVENTOR.*
LUIS A. VILLAFUERTE ROZAS,
BY *Victor J. Evans & Co.*
ATTORNEYS

Nov. 14, 1950 L. A. V. ROZAS 2,529,966
PROPELLING ROD FOR PARACHUTIST
Filed Aug. 15, 1946 3 Sheets-Sheet 2

INVENTOR.
LUIS A. VILLAFUERTE ROZAS
BY Victor J. Evans & Co.
ATTORNEYS

Nov. 14, 1950 — L. A. V. ROZAS — 2,529,966
PROPELLING ROD FOR PARACHUTIST
Filed Aug. 15, 1946 — 3 Sheets-Sheet 3

INVENTOR.
LUIS A. VILLAFUERTE ROZAS,
BY Victor J. Evans & Co.
ATTORNEYS

Patented Nov. 14, 1950

2,529,966

UNITED STATES PATENT OFFICE 2,529,966

PROPELLING ROD FOR PARACHUTIST

Luis Alberto Villafuerte Rozas, Cuzco, Peru

Application August 15, 1946, Serial No. 690,776

3 Claims. (Cl. 244—138)

This invention relates to a propelling rod for a parachute whereby the parachutist is able to control his descent to avoid landing in undesirable locations.

An object of the invention is to provide a manual control for a parachute whereby the parachutist may control the descent of the parachute.

Another object of the invention is to provide propellers for the parachute that will enable the parachutist to control the rise and fall of his parachute.

With the above and other objects and advantages in view the invention consists of the novel details of construction, arrangement and combination of parts more fully hereinafter described, claimed and illustrated in the accompanying drawings in which:

Figure 1:
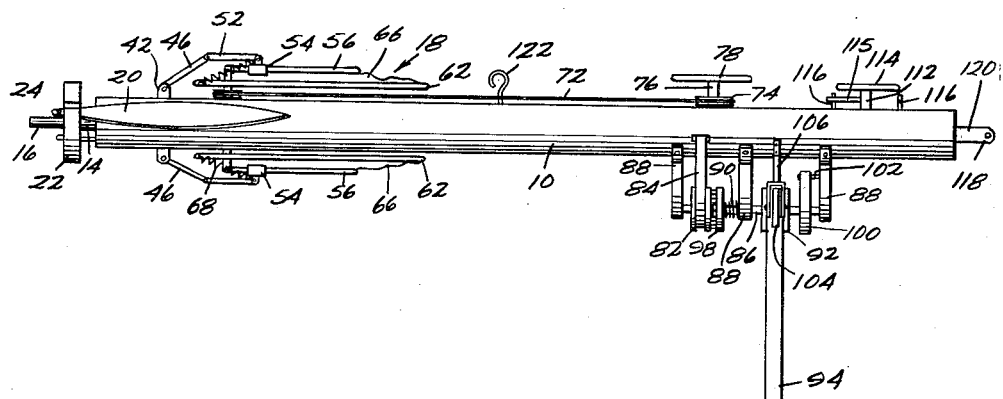
Figure 1 is an elevational view of an embodiment of the invention showing the propellers and partitions in folded position.
Figure 2:
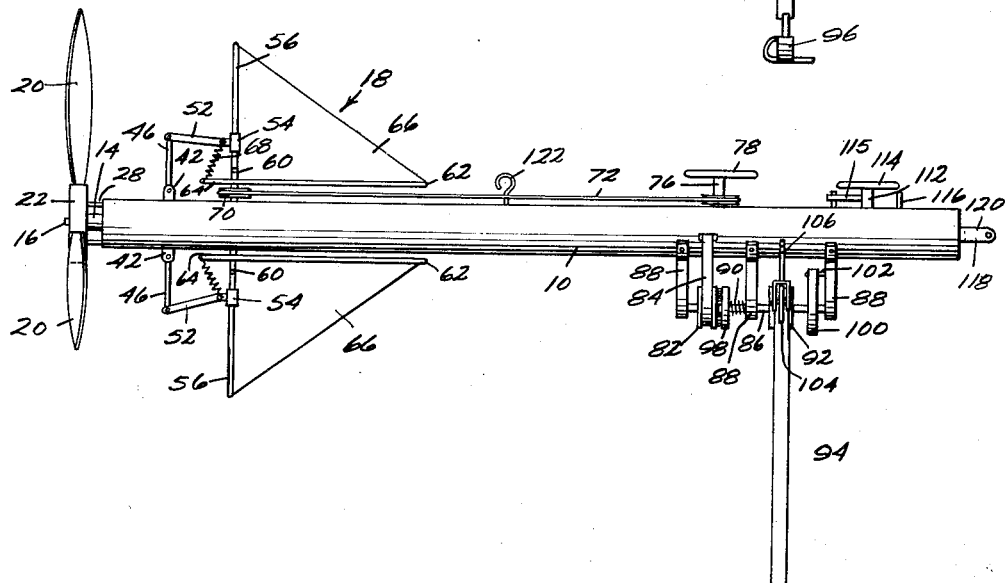
Figure 2 is the same with the propellers and partitions in extended position.
Figures 3, 4:
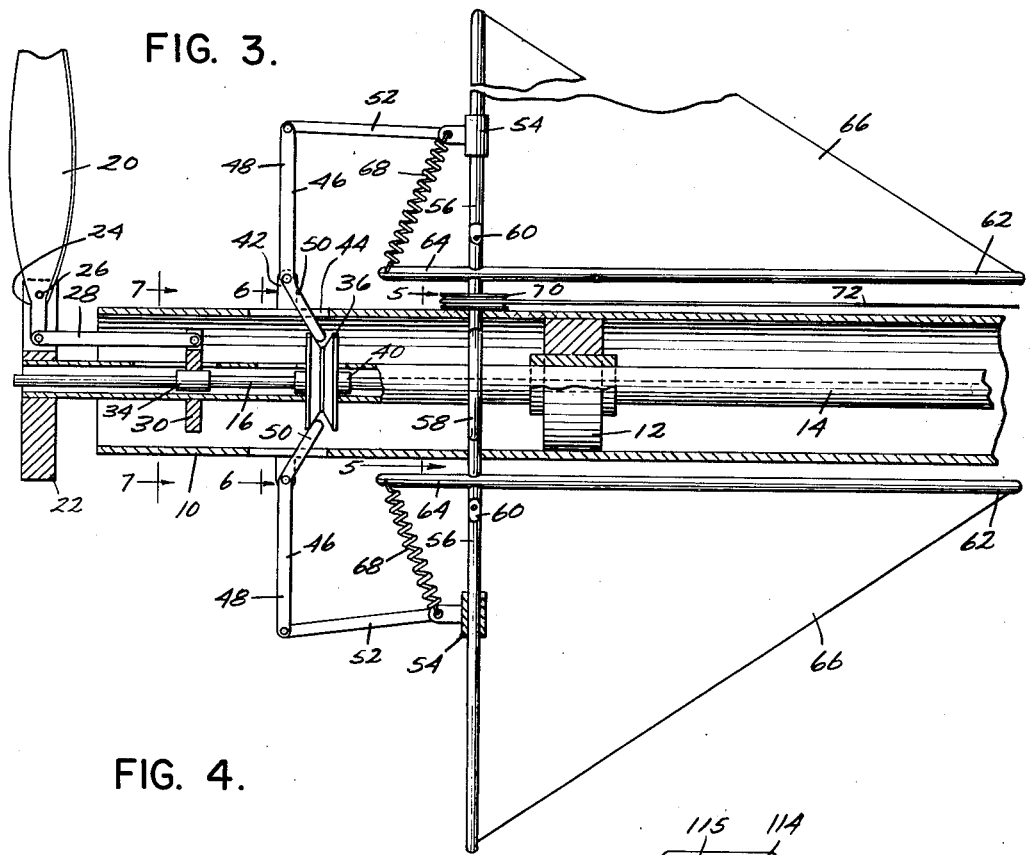
Figure 3 is a detailed sectional view of the forward end of the device.
Figure 4 is a detailed sectional view of the rear end.
Figure 5:
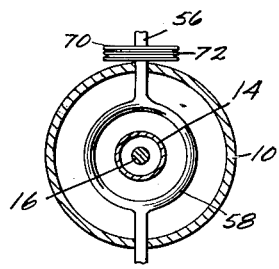
Figure 5 is a sectional view on the line 5—5 of Figure 3.
Figure 6:
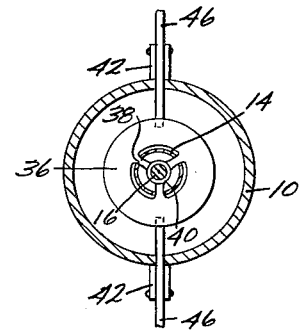
Figure 6 is a sectional view on the line 6—6 of Figure 3.
Figure 7:
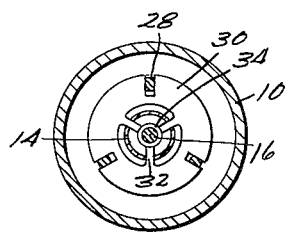
Figure 7 is a sectional view on the line 7—7 of Figure 3.
Figure 8:
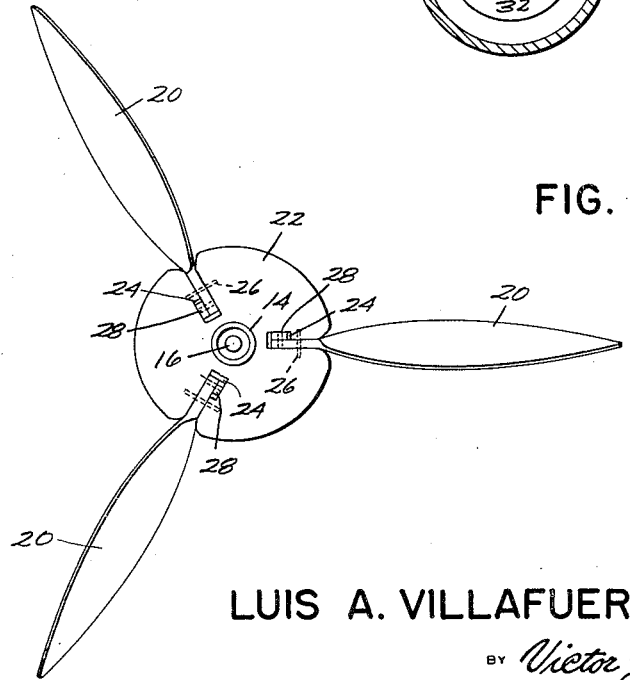
Figure 8 is a front view of the propeller of Figure 3.

Referring more in detail to the drawings the reference numeral 10 designates the tubular body of the control rod in which is mounted by means of bearings 12, the tubular propelling axle 14 in which is slidably mounted the sliding axle 16 for rudders 18 and propellers 20, mounted on the end of the axle 14 is the circular supporting base 22 having the diverging slots 24 in which the propellers 20 are pivotally mounted at 26, pivotably connected to each propeller 20 are the links 28 which are pivotally connected to the collar 30 secured to the axle 16 by webs 32 and inner collar 34.

Rearwardly of the collar 30 is a pulley 36 secured to the axle 16 by webs 38 and inner collar 40. The body 10 is provided with lugs 42 adjacent slots 44 and pivotally mounted on the lugs 42 are the levers 46 having the straight portion 48 and inclined portion 50 which are engaged in the pulley 36.

Pivotally connected to the ends of the straight portions 48 of the levers 46 are the links 52 which are pivotally connected to the collars 54 secured to the oppositely positioned arms 56 formed on the ring 58 mounted internally of the body 10 and surrounding the axle 14. The arms 56 have a pivoted or elbow joint at 60 in order that the arms may be folded against the body 10 as shown in Figure 1.

Extending at right angles to the arms 56 inwardly of the joint 60 are the fixed arms 62, the ends 64 of which extend beyond the arms 56 and the arms 56 and 62 form the supporting frame for the cloth partitions 66 of the rudders 18.

The arms 56 are tensioned by springs 68 connected to the collars 54 which are beyond the joint 60 and the ends 64 of the arms 62, thus maintaining the arms in extended or right angular relationship with the body 10.

Secured to one of the arms 56 exteriorly of the body 10 and inwardly of the arm 62 is the transmission pulley 70 of the rudders 18 and a belt 72 is trained over pulley 70 and pulley 74 mounted on the shaft 76 of the wheel 78 for operating the rudders 18.

Mounted on the axle 14 inwardly of the bearing 12 is the transmission pulley 80 for the axle 14 which is connected to the propeller reel 82 by means of the transmission belt 84, the reel 82 is mounted on the shaft 86 supported by arms 88 secured to the body 10 in a parallel relationship to each other, and a spring 90 on the shaft 86 tensions the reel clutch 98.

Also mounted on the shaft 86 is the winding bobbin 92 for the propeller cord 94 the end of which is provided with a stirrup 96. The reel 82 is provided with a clutch 98 and a coil steel spring 100 mounted on the shaft acts as a winding bobbin for the cord 94, one end of the spring 100 being connected by the pin 102 to one of the arms 88 and a roller 104 mounted in the forked arm 106 secured to the body 10 rolls the cord 94 smoothly and evenly on the bobbin 92.

The axle 16 is connected by means of a universal joint 108 to a stub axle 110 connected to the crank 112 journalled in the body 10 and a hand wheel 114 on the end of the crank 112 actuates the crank 112 as desired to impart sliding motion to the axle 16. The crank 112 is provided with an arm 115 outwardly of the body 10 which is adapted to contact the extending lug stops 116 positioned in diametrically opposite positions to each other and parallel with the crank 112.

A coupling arm 118 is secured to the end of the body 10 and is provided with elbows 120 to which the parachutist belt is attached at approximately the center of the body 10 a supporting hook 122 is secured thereto for connection to the parachute.

As a precautionary measure the body may have an emergency cord attached to it at one end opposite to the end to which the belt is attached which will prevent the parachutist from abandoning the body after bailing out.

After bailing out and with the parachute unfolded the parachutist keeps the propeller rod in his hands with the propellers and rudders folded. If he desires to use the propellers and rudders he turns the wheel 114 to slide the axle 16 forward to unfold the rudders and propellers. Then he places his foot in the stirrup 96 which is rolled up on the reel or bobbin 92 and by a pumping action thereon he will rotate the propellers and by turning of the wheel 78 he can control the direction of his travel from right to left imparting greater or less inclination to the rudders to accelerate the turning movement. To accelerate the propelling power of the rod the parachutist is able to control the inclination of the parachute which is achieved by pulling on the directional cords to which the rod is attached and are located at the front.

It is believed that the operation and construction of the device will be apparent to those skilled in the art and it is to be understood that changes in the details of construction, arrangement and combination of parts may be resorted to provided they fall within the spirit of the invention and the scope of the appended claims.

Having thus described the invention what is claimed as new and desired to be secured by Letters Patent is:

1. A device of the character described, comprising a tubular body, a tubular axle mounted in said body, propelling means mounted on the end of said tubular axle, a second axle mounted for sliding movement in said tubular axle, links connected to the inner ends of said propelling means, means on said second axle connected to the links on the inner ends of said propelling means for placing said propelling means in operative and inoperative positions, means for imparting motion to said second axle and a spring wound manually operated winding bobbin on said tubular body for imparting rotating motion to said propelling means, and the means for imparting motion to said second axle being located exteriorly of, but secured to said body.

2. The invention as in claim 1 wherein means for controlling the direction of travel of said body is mounted on said body rearwardly of said propelling means.

3. The invention as in claim 1 wherein the bobbin adapted for imparting rotary motion to said propelling means is provided with foot actuated means for the manual actuation thereof.

LUIS ALBERTO VILLAFUERTE ROZAS.

REFERENCES CITED

The following references are of record in the file of this patent:

UNITED STATES PATENTS

| Number | Name | Date |
|---|---|---|
| 1,278,158 | Jones | Sept. 10, 1918 |

FOREIGN PATENTS

| Number | Country | Date |
|---|---|---|
| 4,504 | Great Britain | of 1908 |